United States Patent [19]
Gire

[11] Patent Number: 5,450,667
[45] Date of Patent: Sep. 19, 1995

[54] PROCESS FOR FIXING A TRANSVERSE PARTITION IN A TUBULAR HEADER OF A HEAT EXCHANGER

[75] Inventor: Hélène Gire, Asnieres, France

[73] Assignee: Valeo Thermique Moteur, Le Mesnil-Saint-Denis, France

[21] Appl. No.: 261,774

[22] Filed: Jun. 20, 1994

[51] Int. Cl.⁶ ............................................. B29D 39/00
[52] U.S. Cl. ........................ 29/890.052; 29/890.043; 29/522.1; 29/521; 165/176
[58] Field of Search ............... 29/890.043, 890.052, 29/522.1, 521; 165/176, 174; 138/89

[56] References Cited

U.S. PATENT DOCUMENTS

| | | | |
|---|---|---|---|
| 3,909,920 | 10/1975 | Cornish et al. | 29/522.1 |
| 4,546,825 | 10/1985 | Melnyk jet al. | 29/890.043 |
| 5,016,674 | 5/1991 | Kiss | 138/89 |
| 5,067,235 | 11/1991 | Kato et al. | 29/890.043 |
| 5,118,079 | 6/1992 | Watts | 138/89 |
| 5,121,537 | 6/1992 | Matsui et al. | 29/522.1 |
| 5,207,247 | 5/1993 | Hood | 138/89 |
| 5,209,292 | 5/1993 | Aineson et al. | 165/176 |
| 5,226,490 | 7/1993 | Ryan et al. | 165/174 |
| 5,233,756 | 8/1993 | le Gauyer . | |

FOREIGN PATENT DOCUMENTS 0521489 7/1993 European Pat. Off. .
2676535 5/1991 France .

Primary Examiner—Irene Cuda
Assistant Examiner—Marc W. Butler
Attorney, Agent, or Firm—Morgan & Finnegan

[57] ABSTRACT

In a process for producing a heat exchanger comprising at least one header having a tubular wall is separated into compartments by a substantially disc-shaped transverse partition. The partition is introduced into the tubular wall through an open end of the wall to bring it into the position it has to occupy. Then, the partition is deformed by means of punches comprising annular ribs applied against the two faces thereof by expanding it radially so as to immobilize into position by clamping within the tubular wall. The invention is particularly applicable to condensers for air conditioning units of motor vehicles.

9 Claims, 1 Drawing Sheet

PROCESS FOR FIXING A TRANSVERSE PARTITION IN A TUBULAR HEADER OF A HEAT EXCHANGER

FIELD OF THE INVENTION

The invention relates to heat exchangers of the kind comprising at least one header having a tubular wall, separated into compartments by one or more transverse partitions, and a multiplicity of parallel tubes, each communicating with a compartment of the header through an aperture in the tubular wall.

BACKGROUND OF THE INVENTION

Such a heat exchanger, which can be used in particular as a condenser in an air conditioning installation for a motor vehicle, is described in EP-A-0 377 936. In this known exchanger, the tubular wall has transverse apertures, each partition being introduced laterally through one of these apertures and having a suitable contour enabling it to engage the end of this same aperture. The partition located in this manner is then soldered to the tubular wall. This arrangement has the disadvantage of complicating the production of the tubular wall by the machining of apertures and necessitates an irregular shape for the partition. Furthermore, these apertures create additional risks of leakage.

To overcome these drawbacks, FR-A-2 676 535 proposes introducing the partition into the tubular wall, through an open end thereof, to bring it into the position which it has to occupy, then to deform the tubular wall on either side of the partition to fix it in position.

The invention offers an even simpler solution, particularly adapted to the case in which the header comprises a single transverse partition.

DISCUSSION OF THE INVENTION

The invention relates to a process for producing a heat exchanger comprising at least one header having a tubular wall, separated into compartments by a substantially disc-shaped transverse partition, and a multiplicity of parallel tubes, each communicating with a compartment of the header through an aperture in the tubular wall, in which process the partition is introduced into the tubular wall through an open end thereof, to bring it into the position it has to occupy.

According to the invention, the partition is then deformed by means of tools applied against the two faces thereof, by expanding it radially so as to immobilise it in the said position by clamping within the tubular wall.

Other complementary or alternative characteristics of the invention are given below:

- at least one of the tools is a punch comprising a protruding region forming a hollow impression in the corresponding face of the partition;
- the protruding region is limited radially outwardly by a first annular surface surrounding the longitudinal axis of the tubular wall and inclined in relation thereto;
- the protruding region is limited radially inwardly by a second annular surface inclined in relation to the said axis in the opposite direction to the first annular surface and defining therewith an annular engagement edge;
- the first annular surface is more steeply inclined than the second annular surface;
- punches comprising protruding regions disposed roughly opposite one another are applied against the two faces of the partition;
- the tools are applied against the faces of the partition by percussion;
- the tubular wall is soldered to the partition and/or to the tubes in a fluid-tight manner; and
- soldering is performed by fusing a meltable metal coating provided on at least one of the parts to be soldered.

BRIEF DESCRIPTION OF THE DRAWINGS

The characteristics and advantages of the invention are given in greater detail in the following description, with reference to the drawings, in which.

DETAILED DESCRIPTION OF A PREFERRED EMBODIMENT

Figure 1:
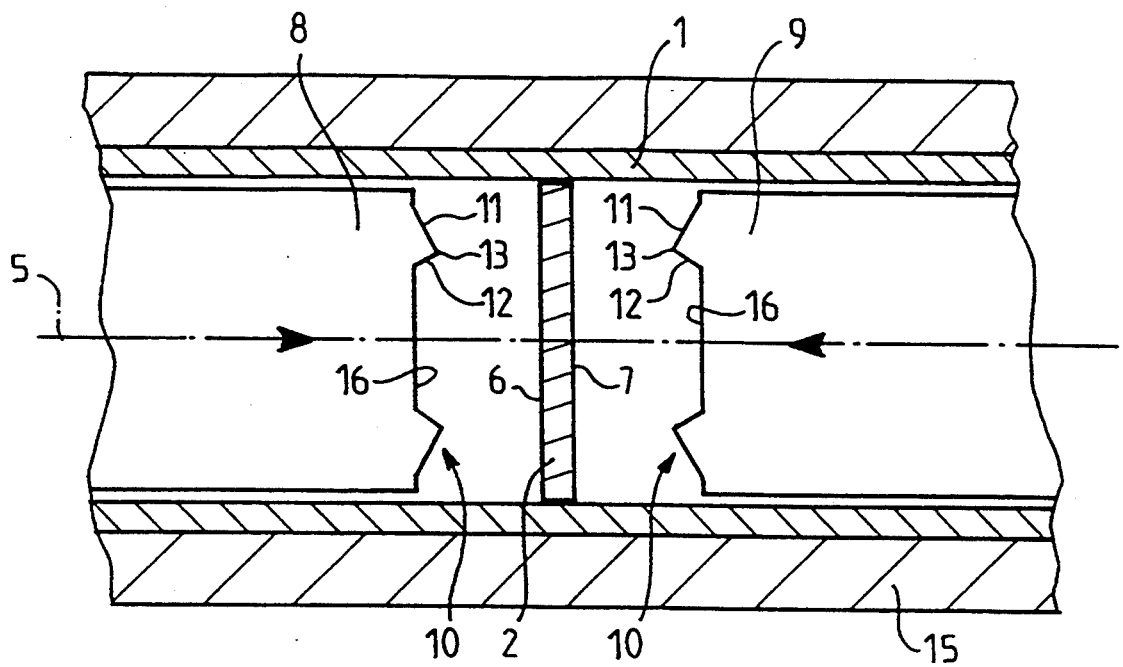
FIGS. 1 and 2 are views in axial section showing two successive phases of the process according to the invention.
Figure 2:
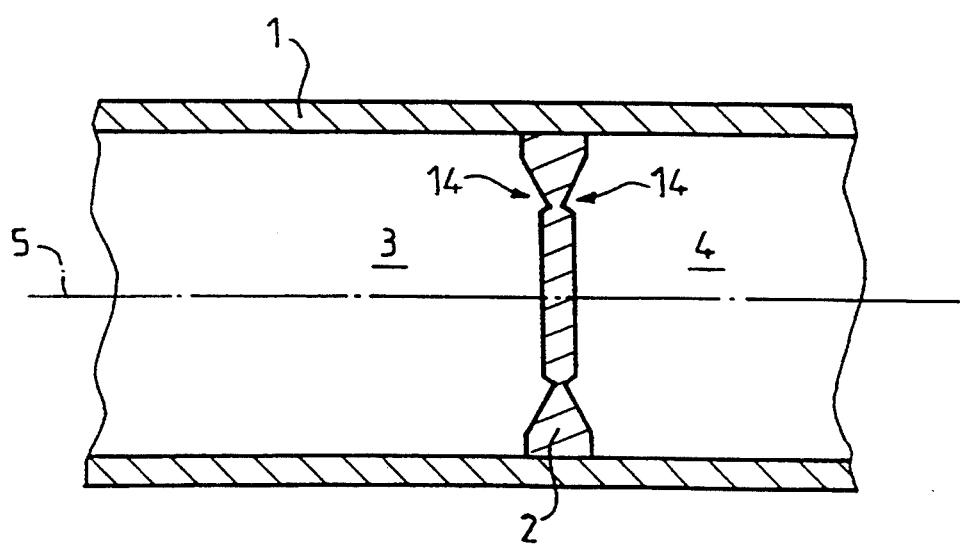

The drawings show, in FIG. 1 a tubular wall 1 for a header of a heat exchanger, particularly a condenser for an air conditioning installation in the passenger space of a motor vehicle, and a disc-shaped transverse partition 2 (also shown in FIG. 1) for separating, as best illustrated in FIG. 2, the interior volume of the header into two compartments 3 and 4. The finished heat exchanger comprises a series of fluid circulation tubes (not shown), orientated perpendicular to the longitudinal axis 5 of the tubular wall and mutually aligned along it, the ends of which pass through apertures provided in the tubular wall, and some of which open into the compartment 3 and others into compartment 4.

In its initial state, as shown in FIG. 1, the partition 2 has opposite faces 6 and 7 which are plane and parallel, and has a diameter which is slightly less than the internal diameter of the tubular wall 1. Therefore it can be introduced into said tube with clearance, through one of the open ends of said wall, to be brought into the desired position. Two punches 8 and 9 are also introduced with clearance into the tubular wall, on either side of the partition. The end face of each punch turned towards the partition, or working face, has an annular rib 10 extending around axis 5, limited by two tapered surfaces, one a radially outer surface 11, one a radially inner surface 12, between them defining a circular edge 13. The generatrix of the surface 11 forms an angle of more than 45° with the axis 5, and that of the surface 12 encloses an angle less than 45°. The tops of the cones to which these surfaces belong are situated respectively on the side of the partition 2 and on the side of the body of the punch in relation to the working face thereof. The annular surface 12 delimits a central recess having a flat base 16 in the working face of the punch.

To fix the partition into place, its faces 6 and 7 are stamped by means of punches. The ribs 10 then penetrate into these faces by forming annular impressions 14 (FIG. 2). Furthermore the inclined surfaces 11 (FIG. 1) of the ribs emboss the material of the partition radially outwardly, increasing the external diameter thereof and causing its radial clamping in the tubular wall 1. To avoid an expansion of the latter by the radial thrust exerted by the partition, the tubular wall can be inserted into a thick sleeve 15, also as shown in FIG. 1, during this operation.

Once the position of the partition has been stabilised in this manner, the seal between the compartments 3 and 4 (FIG. 2) can be ensured by soldering in the normal manner. Similar, soldering can be performed between the tubular wall and the circulation tubes, after the positioning of the latter.

The working faces of the punches may have a different shape from that described and shown. In particular, the recess defined by the tapered surfaces 12 (FIG. 1) and the flat base 16 may be omitted and replaced by a plane surface limited by the circular edge 13.

What is claimed is:

1. A process for producing a heat exchanger with at least one header having a longitudinal axis and an open-ended tubular wall with a plurality of tube openings formed therein, the header being separated into compartments by a substantially disc-shaped transverse partition, and a multiplicity of parallel tubes, each communicating with a compartment of the header through a respective tube opening in the tubular wall, in which the process comprises of introducing the partition into the tubular wall through an open end thereof, bringing the partition into a position which it has to occupy, deforming the partition by means of tools applied against its two faces thereof, in order to expand the partition radially to immobilize the partition in said position by clamping the partition within the tubular wall.

2. A process according to claim 1, wherein the tools are applied against the faces of the partition by percussion.

3. A process according to claim 1, wherein the tubular wall is soldered to the partition and to the tubes in a fluid-tight manner.

4. A process according to claim 3, wherein the soldering is performed by fusing a meltable metal covering provided on at least one of the pieces to be soldered.

5. A process according to claim 1, wherein at least one of said tools is a punch comprising a protruding region forming a hollow impression in a corresponding face of the partition.

6. A process according to claim 2, wherein punches comprising protruding regions disposed roughly opposite one another are applied against said two faces of the partition.

7. A process according to claim 5, wherein said protruding region is limited radially outwardly by a first annular surface surrounding a longitudinal axis of the tubular wall and inclined in relation thereto.

8. A process according to claim 7, wherein said protruding region is limited radially inwardly by a second annular surface inclined in relation to the axis in an opposite direction to the first annular surface and defining therewith an annular engagement edge.

9. A process according to claim 4, wherein the first annular surface is more steeply inclined than the second annular surface.

* * * * *